United States Patent [19]
Moffett

[11] 4,438,755
[45] Mar. 27, 1984

[54] WOOD BURNING STOVE HAVING WATER HEATER

[76] Inventor: Daniel J. Moffett, Route 2, Box 99B, Osceola, Wis. 54020

[21] Appl. No.: 446,043

[22] Filed: Jan. 31, 1983

[51] Int. Cl.³ .............................................. F24C 13/00
[52] U.S. Cl. ......................................... 126/34; 122/9; 126/132
[58] Field of Search ..................... 126/31, 34, 35, 132, 126/344; 122/9, 17

[56] References Cited

U.S. PATENT DOCUMENTS

| | | | |
|---|---|---|---|
| 479,697 | 7/1892 | Bliss | 122/9 |
| 718,756 | 1/1903 | Giroux | 122/9 |
| 787,253 | 4/1905 | Wottring | 122/17 |
| 1,140,908 | 5/1915 | Lowenstein | 122/9 |
| 1,242,294 | 10/1917 | Will | 126/34 |
| 1,248,793 | 12/1917 | Becker | 126/34 |
| 1,556,274 | 10/1925 | Wilkinson | 126/34 |
| 2,178,002 | 10/1939 | Simpson | 126/34 |
| 2,465,361 | 3/1949 | Dufault | 126/34 |
| 4,195,617 | 4/1980 | Scopetti | 126/34 |
| 4,230,267 | 10/1980 | Dotschkal | 126/132 |
| 4,258,880 | 3/1981 | Williamson | 126/132 |
| 4,352,454 | 10/1982 | Ewing | 126/132 |
| 4,392,455 | 7/1983 | Jarvis | 126/34 |
| 4,403,573 | 9/1983 | Cauchy | 126/132 |

*Primary Examiner*—Daniel J. O'Connor

[57] ABSTRACT

A solid fuel burning stove having a hot water heating means. A water containing chamber open at the top for communication with room air serves the dual purpose of providing a heat sink for preheating water while at the same time providing a means for humidifying the room air. Domestic water heating coils are positioned so that cold water flows first through coils located at the water containing reservoir where it is preheated and then passes into the combustion chamber where it is heated to a high temperature before flowing into a hot water tank. The stove is preferably also provided with a small baking oven.

5 Claims, 2 Drawing Figures

WOOD BURNING STOVE HAVING WATER HEATER

BACKGROUND OF THE INVENTION

Stoves which burn solid fuels such as wood, coal and briquettes have previously had incorporated into them heat exchange tubes for heating water. See, for example, U.S. Pat. No. 2,521,142. Such stove and heating devices afford a means for conserving fuel oil, gas or electricity by substituting less expensive or more plentiful fuels such as wood or coal.

The present invention provides an improvement for such stoves. In the preferred embodiment the present invention involves a stove suitable for home use as a supplementary heating means capable, if desired, of use for some cooking and baking chores while at the same time providing an inexpensive means for heating of domestic hot water.

The stove according to the present invention includes a conventional fire chamber confined within metal walls having conventional fuel loading doors, dampers and exhaust flues. The stove utilizes a hot water heat sink which is in open 20 communication with the room air, thus supplying humidity into the air when the stove is in use. The present invention further contemplates the use of such water reservoir as a heat sink for preheating domestic water by passage of said water through a heat exchanger located in the water reservoir prior to passage through further heat exchangers located within the fire chamber. Such water reservoir further provides moderate heating of the water even when the fire has burned down by extracting.

It is the primary object of the present invention to provide an improved wood or coal burning stove which is of a relatively inexpensive and practical design suitable for use in the average home. This and other objects of the invention will become clear from an inspection of the detailed description of the invention, and from the appended claims.

DETAILED DESCRIPTION OF THE INVENTION

Figure 1:
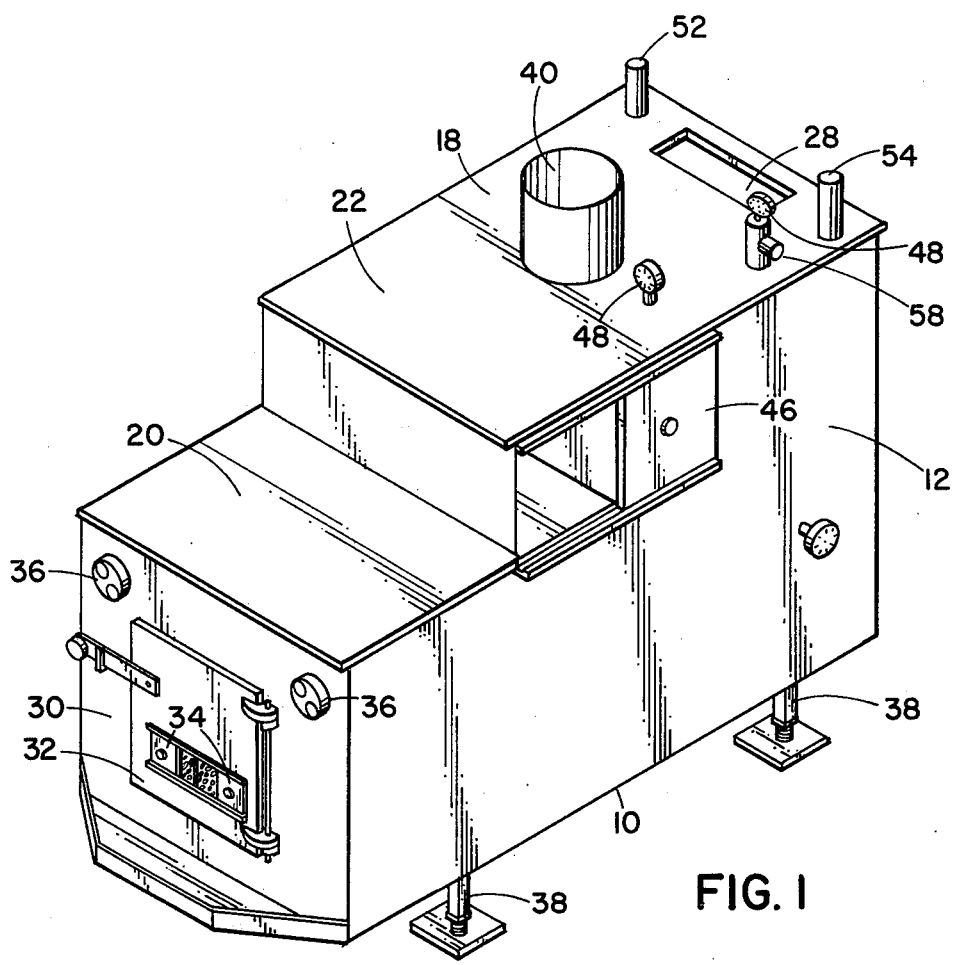
FIG. 1 is a perspective view of an exemplary stove according to the present invention.
Figure 2:
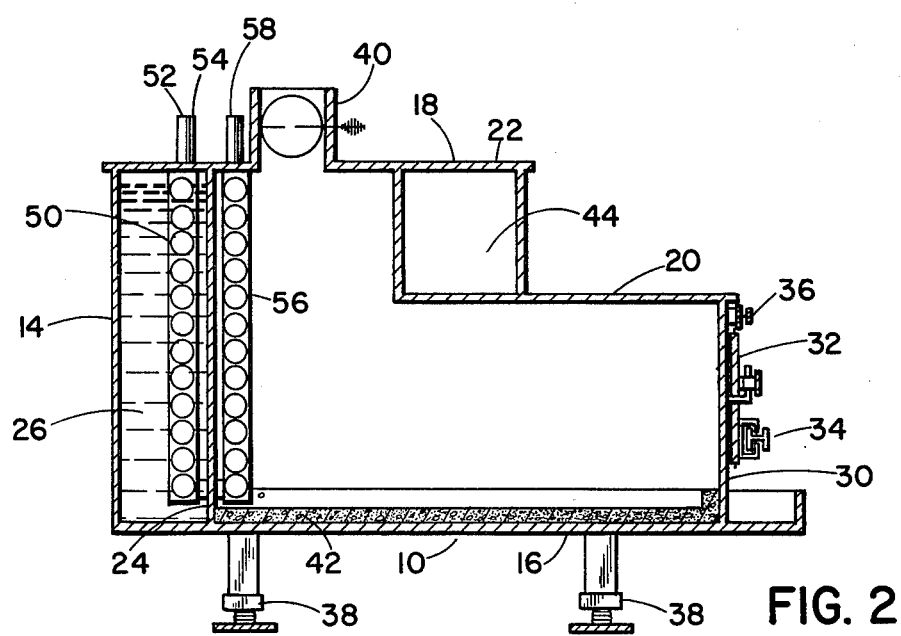
FIG. 2 is a cross-sectional side view of the stove in FIG. 1.

A wood or coal burning stove according to the present invention as shown generally at 10 in FIG. 1 and FIG. 2. This stove includes side walls 12, a back wall 14, a bottom wall 16 and a top wall 18 with cooking surfaces 20 and 22 disposed at different levels. Interior wall 24 is provided so as to form a water containing chamber for heat sink 26 at the rear of the stove. An opening 28 is formed in top wall 18 to permit filling of the heat sink 26 and transmission of water vapors to the atmosphere.

Front wall of the stove 30 is provided with a conventional door 32 which is provided with primary air intake openings which are preferably adjustable. Conventional grate openings below the door may also be employed as an alternative. The front wall may also be provided with secondary air intake openings 36 if desired.

Stove 10 may also be provided with supporting legs 38 of conventional design. Conventional exhaust flue 40 is also provided for conveying the smoke and other exhaust gasses to a chimney. A conventional damper of the butter-fly type may be provided in the exhaust flue. As seen in FIG. 2 the bottom of the stove may be provided with fire brick 42. In the preferred embodiment a small oven 44 having an opening door 46 at the end thereof is provided so that the stove may be used for baking small amounts of bread or rolls or other food preparation. The stepped top surfaces of the stove 20 and 22 provide cooking surfaces of differing temperatures, particularly in view of the fact that oven 44 somewhat separates surface 22 from the direct action of the fire. The stove is preferably provided with temperature gauges 48 of conventional design.

Located within heat sink 26 is a first set of heat exchange coils 50. An intake pipe 52 is provided to conduct the flow of cold water into coil 50. Intake pipe 52 would normally be connected to a domestic cold water supply. An outflow pipe 54 is also connected to coil 50 and provides for the outflow of water which has been preheated in coil 50 into a second coil 56 which is located within the firebox. While pipe 54 is shown for purposes of illustration as passing above the top surface of the stove, it may readily be located beneath the surface to provide a stove design of cleaner appearing design.

In operation, the usual water pressure differentials occurring when a faucet is opened causes water to flow through intake pipe 52 into the preheating coil 50 where a heat exchange from heat sink 26 occurs. The preheated water is then caused to flow through pipe 54 into heat exchanger 56. The burning of a fire in the fire chamber of the stove causes heating of water in the heat sink 26. A portion of this stored up heat is extracted by the heat exchange coil 50. The preheated water flowing out of the coil 50 is then readily heated to the desired hot water temperature when it flows through heat exchange coils 56. The intensity of the fire in the firebox can be adjusted by adjustment of the air intake control 34 and 36. Constant evaporation of some of the water in the heat sink 26 occurs through opening 28 providing needed humidity to the room air. It has been found that with a stove of the type illustrated, passage of the water through the heat sink reservoir causes a 30° to 40° F. rise in temperature. Without this preheating, it is difficult for such a stove to provide hot water of a temperature sufficient to satisfy formal domestic needs.

The hot water emerging from the combustion chamber is discharged through outlet pipe 58 to conventional water pipes leading to a conventional domestic hot water heater. It is desirable to maintain continuous circulation of the water from the stove of this invention through the hot water heater either by means of thermosyphoning or by means of pump (not shown). Such pump could be activated by a temperature controlled switch so that circulation occurs only when the stove is hot. It has been found that a slow flow of water is desirable. This permits the flowing water to extract as much heat as is being provided by the stove without unduly cooling down the stove.

While the preferred embodiment comprises a small free standing stove, it will be understood that a preheat sink of the design of this invention may be used in connection with a hot-water boiler, a wood or coal furnace, a cook stove of conventional design, or even a trash burner.

In a further embodiment the heat exchange system using the preheat sink may be employed to heat water for heating purposes rather than for domestic hot water. The use of such system enables heating of more than one room with a free standing wood stove by provision of heating radiators to which the stove is connected.

Other modifications and further embodiments will be apparent to those skilled in the art.

What is claimed is:

1. A solid fuel burning stove comprising
   (a) a combustion chamber having openings for introduction of fuel, intake of air and exhaust of smoke;
   (b) a tank adjacent said combustion chamber having the top thereof open to the atmosphere;
   (c) a heat exchange device positioned in said tank adapted to cause preheating of water circulated therethrough;
   (d) a second heat exchange device located in the combustion chamber adapted to heat said preheated water to an elevated temperature, and
   (e) suitable conduit means for carrying a flow of water into said first heat exchange device, from said first heat exchange device to said second heat exchange device and therefrom to a hot water distribution system.

2. A stove according to claim 1 which comprises a free standing stove having cooking surfaces at the top thereof and an oven therein for food preparation.

3. A free standing wood-burning stove suitable for residential use for home heating and domestic hot water heating comprising
   (a) a combustion chamber having adjustable air intake openings and an exhaust flue suitable for connection to a chimney;
   (b) a tank for containing water adjacent to said combustion chamber having the top thereof in communication with the atmosphere;
   (c) a heat exchange coil positioned in said tank having an intake means connected to the domestic cold water supply and an outflow pipe leading to;
   (d) a second heat exchange means located in the combustion chamber adapted to cause the fire within said chamber to heat water in said heat exchanger to an elevated temperature, and
   (e) discharge pipe for carrying a flow of hot water from said stove to a hot water distribution system.

4. A stove according to claim 3 wherein cooking surfaces of different elevations are provided at the top of said stove.

5. Device according to claim 3 wherein a small oven is provided at the top of said stove.

* * * * *